(No Model.)
A. WEBER.
DENTAL ENGINE HAND PIECE.
No. 351,821. Patented Nov. 2, 1886.
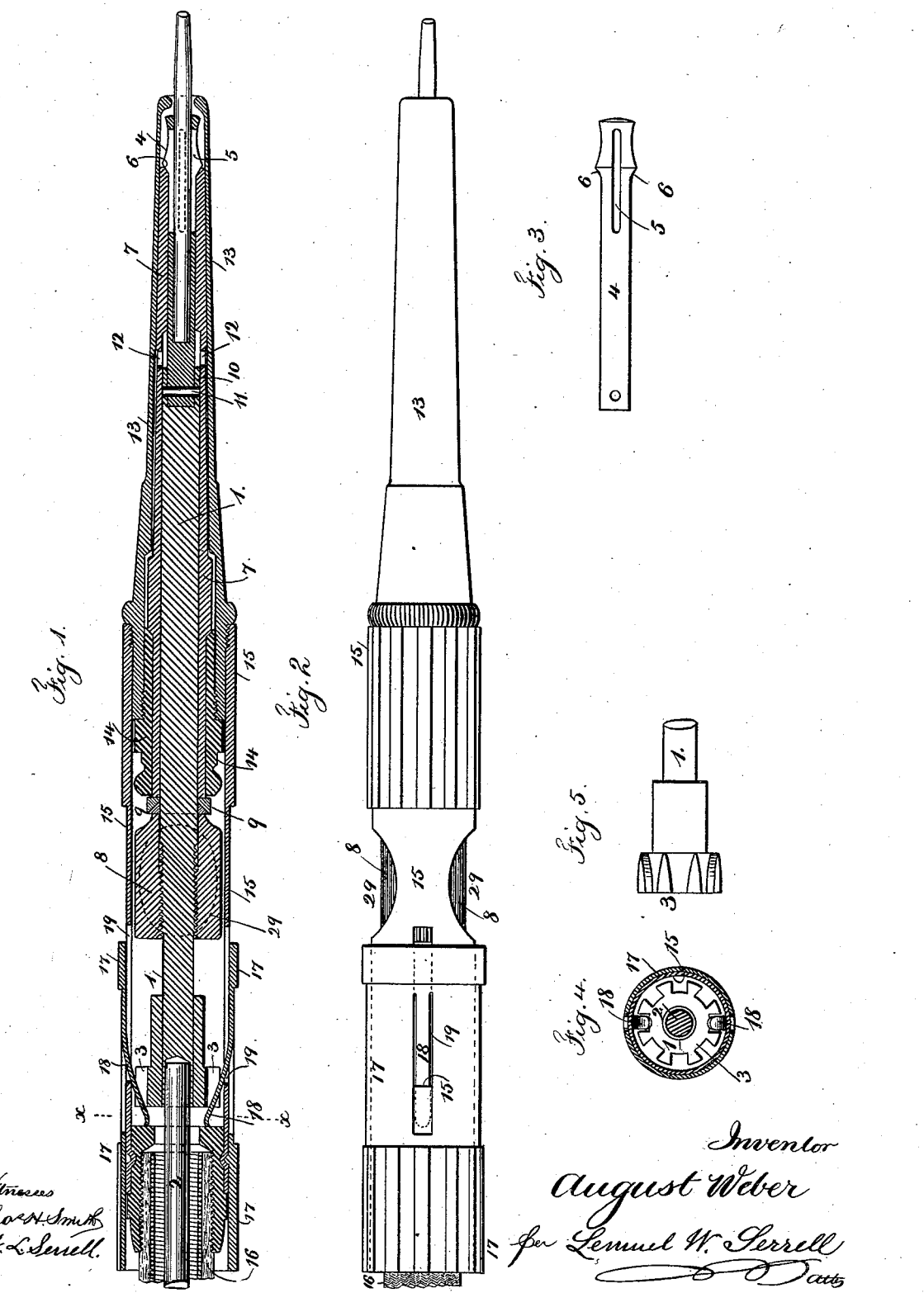

UNITED STATES PATENT OFFICE.

AUGUST WEBER, OF NEW YORK, N. Y.

DENTAL-ENGINE HAND-PIECE.

SPECIFICATION forming part of Letters Patent No. 351,821, dated November 2, 1886.

Application filed March 9, 1886. Serial No. 194,577. (No model.)

*To all whom it may concern:*

Be it known that I, AUGUST WEBER, of the city and State of New York, have invented an Improvement in Hand-Pieces for Dental Engines, of which the following is a specification.

In using dental hand-pieces it is important to be able to hold the hand-piece and loosen the tool with one hand, so as to have the other hand at liberty for removing the tool or placing another into the chuck, or for doing any other of the numerous duties required of the dentist while operating upon the teeth.

In the dental hand-pieces heretofore made it is usual to tighten and loosen the tool by grasping the milled heads or nuts between the finger and thumb, one in each hand, and turning one of the milled heads of screw-tightening device, while the other one is held stationary. This hand-piece is much more complicated and costly, and the hand-piece is larger and heavier than with my improvement.

In my present improvement I provide for changing the chuck, in case of injury to the same, without having to introduce a new spindle, as heretofore usual in dental pieces.

In the drawings, Figure 1 is a section longitudinally of the dental hand-piece upon a magnified scale. Fig. 2 is an external view of the same. Fig. 3 is a detached view of the chuck. Fig. 4 is a cross-section at the line *x x*, Fig. 1, and Fig. 5 is an elevation of the inner end of the spindle.

The spindle 1 is connected to the flexible shaft 2, and it is provided near one end with a crown-piece, 3, the periphery of which is notched, for a purpose hereinafter set forth. At the end of the spindle is the clamping-chuck 4. This is made with a taper or cone, 6, upon its exterior surface, at a short distance from the outer end. This chuck is tubular, and of an internal size to correspond to the shanks of the tools made use of. In chucks that have heretofore been made it is usual to split them longitudinally from the end inwardly. This allows for introducing drills with the shanks that are too large, or they may be too small, and hence the clamping action of the chuck is unreliable and the tool may not be held firmly or run truly. To obviate the aforesaid difficulties, I slit the chuck longitudinally through the tapering portion, and at each side thereof, in three or more places, as at 5, to form springs; but these slits do not extend to the outer end of the chuck; hence the extreme outer end of the chuck is simply tubular, and it prevents the introduction of a drill-shaft that is too large; but the proper size of shank, when inserted, is clamped and firmly held by the compression resulting from the end movement given to the spindle to draw the cone 6 within the end of the tube 7 and press the spring portion of the chuck upon the tool-shank.

Around the spindle 1 is a nut, 8, between which and the end of the tube 7 is a washer, 9; and to clamp the tool within the chuck it is necessary to hold the crown-piece 3 while the nut 8 is revolved and the washer 9 is pressed into contact with the end of the tube 7, and the spindle is drawn along endwise and the cone 6 pressed into the end of the tube 7 to clamp the tool within the spring portion of the chuck. By this feature of my improvement the tool is held axially and firmly clamped within the chuck.

It sometimes happens that the chuck is injured or broken by careless use, and to replace the same it has heretofore been necessary to introduce a new spindle. I avoid this expense by making the spindle 1 tubular at 10, for the reception of the inner end of the clamping-chuck 4, and I insert a cross-pin, 11, for holding the two parts together, and in the tube 7 I make a cross-hole at 12, for the insertion or withdrawal of the pin 11; but this cross-hole 12 is a little distance nearer to the end of the tube 7 than the position occupied normally by the cross-pin 11; hence this pin 11 will not slip out of its place; but when it is necessary to remove the pin 11 and take out the chuck 4 the nut 8 is run back upon the spindle 1 and the spindle pushed forward until the pin 11 comes into line with the hole 12, and said pin is then pushed out by a suitable tool.

Around the tube 7 is a case, 13, which is of a conical form, and tapering and roughened upon the exterior surface, so as to be easily handled by the dentist, and there is a space between the end of the tube 7 and the end of the case 13, so that a chamber is formed at this place that prevents oil passing out or the saliva passing into the chuck, and there is a sleeve, 14, around the tube 7 and within the case 13, the same being firmly screwed into the interior of said case 13 at the back end.

From the rear end of spindle 1 the flexible shaft 2 extends, as usual, and by means of this flexible shaft the spindle, the clamping-chuck, the tube 7, and the nut 8 are rotated, and the washer 9 serves to take the wear at this end of the tube 7 as the parts revolve within the sleeve 14 and case 13. Upon the outside of the sleeve 13 is screwed the tubular holder 15, and to the back end of the same is attached the flexible covering-tube 16, within which is the flexible shaft 2, and outside of the tubular holder 15 is the sliding crown-holder 17 in the form of a tube having spring-claws 18, that pass through longitudinal slots 19 in the tubular holder 15, and the ends of the claws 18 and the notches in the crown-piece 3 are tapering, so that the ends of the claws pass freely into the notches in the crown-piece and hold the same when the said crown-holder is slipped endwise upon the tubular holder 15, and in this end movement given to the crown-holder the openings 19 in the holder 15 are uncovered, so that access is given through the openings 29 to the nut 8.

By this improvement the dentist is able to grasp the flexible covering-tube 16 between the palm of the hand and the small fingers, while with the thumb and the forefinger the crown-holder is slipped endwise, and the nut 8 is rotated by the thumb and forefinger to clamp or to liberate the tool within the chuck.

I claim as my invention—

1. The combination, with the flexible shaft and spindle, of a chuck having a parallel hole or bore and a tapering exterior, and longitudinal slots at the tapering portion and extending each way from the said tapering portion to form springs, and leaving the tube whole and without slots at both ends, substantially as set forth.

2. The combination, with the flexible shaft and spindle, of a separate spring-chuck removably attached to the spindle, and a tube around the chuck and spindle and acting at the forward end to close the chuck, substantially as set forth.

3. The combination, with the spindle and the tube surrounding the same, of a separate chuck, a pin to connect the chuck and spindle, there being a cross-hole through the tube to allow for the removal of the pin and the disconnecting of the chuck, substantially as set forth.

4. The combination, with the flexible shaft, the spindle and its crown, the tool-holding chuck, and a nut to move the parts endwise in clamping the tool, of a case and a tubular holder having one or more openings to give access to the nut, and a sliding crown-holder to cover the openings when moved in one direction and to hold one of the parts from turning when moved in the other direction, substantially as set forth.

Signed by me this 16th day of February, A. D. 1886.

AUGUST WEBER.

Witnesses:
GEO. T. PINCKNEY,
WILLIAM G. MOTT.